US009624948B2

(12) United States Patent
Ochiai et al.

(10) Patent No.: US 9,624,948 B2
(45) Date of Patent: Apr. 18, 2017

(54) ELECTROMAGNETIC VALVE

(71) Applicant: DENSO CORPORATION, Kariya-city, Aichi-pref. (JP)

(72) Inventors: Masahiko Ochiai, Nisshin (JP); Jiro Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 223 days.

(21) Appl. No.: 14/327,894

(22) Filed: Jul. 10, 2014

(65) Prior Publication Data
US 2015/0027573 A1 Jan. 29, 2015

(30) Foreign Application Priority Data

Jul. 24, 2013 (JP) ................... 2013-153336

(51) Int. Cl.
*F16K 27/02* (2006.01)
*F16K 27/04* (2006.01)
(Continued)

(52) U.S. Cl.
CPC ............ *F15B 13/0402* (2013.01); *F01L 1/34* (2013.01); *F16K 27/029* (2013.01); *F16K 31/0613* (2013.01); *F01L 2001/3443* (2013.01); *F01L 2810/02* (2013.01); *F01L 2820/01* (2013.01); *F15B 2013/0412* (2013.01); *F16K 27/048* (2013.01); *F16K 31/04* (2013.01); *F16K 31/048* (2013.01); *F16K 31/0603* (2013.01);
(Continued)

(58) Field of Classification Search
CPC .. F16K 27/029; F16K 27/048; F16K 31/0613; F16K 31/0603; F16K 31/04; F16K 31/0675; F01L 1/34; F15B 13/0402; Y10T 137/8671; Y10T 137/8667; Y10T 137/86702; Y10T 137/86622
USPC ............ 137/625.69, 625.25, 625.68, 625.65
See application file for complete search history.

(56) References Cited

U.S. PATENT DOCUMENTS

| | | | |
|---|---|---|---|
| 6,397,891 B1 * | 6/2002 | Neuhaus | ............ G05D 16/2013 137/625.65 |
| 2004/0041114 A1 * | 3/2004 | Hirata | ................. F16K 31/0613 251/129.15 |

(Continued)

FOREIGN PATENT DOCUMENTS

| | | |
|---|---|---|
| JP | 2-81982 | 6/1990 |
| JP | 2003-207067 | 7/2003 |

(Continued)

OTHER PUBLICATIONS

Translation of JP 2003207067.*

(Continued)

*Primary Examiner* — Craig Schneider
*Assistant Examiner* — Kelsey Rohman
(74) *Attorney, Agent, or Firm* — Nixon & Vanderhye P.C.

(57) ABSTRACT

An oil control valve has a cup shaft and a plunger. The cup shaft and the plunger have a projection and a recess to provide a male-female joint. The male-female joint provides contact points which can reduce lateral offset and inclination. The projection and the recess provides two or more force transmitting points from the plunger to the cup shaft, when the projection and the recess are inclined with each other. The force transmitting points are located about the central axis of the spool in a distributed manner.

13 Claims, 12 Drawing Sheets

(51) Int. Cl.
*F16K 31/04* (2006.01)
*F16K 31/06* (2006.01)
*F01L 1/34* (2006.01)
*F15B 13/04* (2006.01)
*F01L 1/344* (2006.01)

(52) U.S. Cl.
CPC ..... *F16K 31/0675* (2013.01); *Y10T 137/8667* (2015.04); *Y10T 137/8671* (2015.04); *Y10T 137/86622* (2015.04); *Y10T 137/86702* (2015.04)

(56) References Cited

U.S. PATENT DOCUMENTS

| | | | |
|---|---|---|---|
| 2004/0134547 A1* | 7/2004 | Moreno | F16K 11/048 137/625.65 |
| 2007/0158604 A1 | 7/2007 | Kondo et al. | |
| 2009/0256092 A1* | 10/2009 | Nordstrom | F16K 31/0613 251/129.15 |

FOREIGN PATENT DOCUMENTS

| | | |
|---|---|---|
| JP | 2009-36345 | 2/2009 |
| JP | 4665869 | 1/2011 |
| JP | 2014-037848 | 2/2014 |
| JP | 2014-037932 | 2/2014 |

OTHER PUBLICATIONS

Office Action (2 pages) dated May 19, 2015, issued in corresponding Japanese Application No. 2013-153336 and English translation (1 page).

* cited by examiner

ELECTROMAGNETIC VALVE

CROSS REFERENCE TO RELATED APPLICATION

This application is based on Japanese Patent Application No. 2013-153336 filed on Jul. 24, 2013, the disclosure of which is incorporated herein by reference.

TECHNICAL FIELD

The present disclosure relates to an electromagnetic valve.

BACKGROUND

Patent Literature 1: JP4618133B
Patent Literature 2: JP4665869B

Patent Literatures 1 and 2 disclose electromagnetic oil control valves (hereinafter referred to as OCV) for a pressurized oil circuit for a variable valve timing mechanism (hereinafter referred to as VVT) for an internal combustion engine (hereinafter referred to as ICE.) OCV is operated to control oil supply to and oil discharge from an advancing chamber and a retarding chamber which are disposed in an actuator for VVT.

OCV is an electromagnetic valve that has a spool valve and an electromagnetic actuator which are axially connected on an axial direction. The spool valve has a cylindrical sleeve and a spool supported within an internal bore of the sleeve in a reciprocally movable manner. The sleeve is formed with IN and OUT ports for oil. The spool changes communications between the IN and OUT ports by controlled to move in an axial direction to change axial location. The internal bore may also be referred to as a guide bore extending along a direction of a central axis. The electromagnetic actuator operates the spool by pushing the spool in a one direction of central axis directions along a central axis, and may also be referred to as a solenoid.

The internal bore of the sleeve is a guide bore for the spool. The guide bore extends straight along the central axis toward a distal end, which is an opposite end to the solenoid, from a base end, which is operatively connected with the solenoid. A return spring, which urges and pushes the spool in the other direction along the central axis, is disposed at a distal end portion within the internal bore of the sleeve.

The solenoid has a plunger, a solenoid coil, an inner stator core, an outer stator core and a connector. The plunger is a movable core, which is made of magnetic material and is connected with the spool via a shaft made of nonmagnetic material in order to be able to move as a single member. The solenoid coil generates magnetic flux and is referred to as a coil. The inner stator core is located radial inside of the coil and provides a magnetic path at the inside of the coil. The outer stator core is located radial outside of the coil and provides a magnetic path on the outside of the coil. The connector provides external electric connection between the coil and an external circuit.

The solenoid is configured to move the spool in the one direction along the central axis toward a full-lifted position on the distal end side from a zero-lifted position on the base end side of the sleeve by attracting the plunger to a magnetic attracting portion on the stator core by using magnetic force generated by the coil. In a case that it is required to reciprocally move the plunger smooth when the solenoid is activated, it is necessary to allow volumetric change on chambers located on both axial ends of the plunger. However, the solenoid is disposed on the cylinder head of the engine in externally exposed condition. Therefore, it is impossible to open the chambers to the air, since it is necessary to prevent oil from leaking outside of the engine.

To address the above-mentioned problem, the following structure may be employed. In this structure, a cup guide formed in a cylindrical shape with one bottom is disposed between an inside of the solenoid, i.e., a radial inside of the stator core and a radial outside of the plunger. In this structure, volumetric change of the chambers may be enabled by communicating the chambers to an inside of the spool bore. The chambers include a back chamber located on a back side of the plunger and a front chamber located on a front side of the chamber. The back chamber may be referred to as a first variable portion. The front chamber may be referred to as a second variable portion.

One known electromagnetic valve is configured to supply oil as lubricant to a slide clearance between the cup guide and the plunger, since the plunger is supported in a guide hole formed on the cup guide in a reciprocally slidable manner.

In addition, Patent Literature 1 discloses OCV which is configured to supply oil to the slide clearance by sucking oil up by using volumetric change, i.e., a suck and discharge action of the chamber on either ends of the plunger. The chamber is communicated to a sub-drain port which is formed on the base end side of the sleeve. However, this OCV may suck foreign matters with oil through the sub-drain port. In a case that if a foreign matter enters into the slide clearance, the cup guide or the plunger may not slide smooth or may create an unexpected amount of abrasion.

Patent Literature 2 discloses an OCV in which the sub-drain port is not formed and the above-mentioned problem is reduced. However, in the case of OCV in Patent Literature 2, if OCV is mounted on an engine with a substantially vertical arrangement, OCV cannot suck sufficient oil up to the solenoid from an axial inner bore of the spool. For example, OCV may be mounted to place the solenoid above than the spool and to arrange an axis of OCV in 60 or more angular degrees with respect to the horizontal plane. In such vertical arrangements, it becomes difficult to supply oil to reach a solenoid portion which is located in the cup guide and needs lubrication. Therefore, the cup guide or the plunger may not slide smooth due to insufficient amount of oil.

SUMMARY

To address the above-mentioned problem, the inventors experimentally developed and manufactured the following OCV. Hereinafter this experimental model is referred to as a comparative embodiment CMP1. CMP1 was developed to achieve the following objects: (1) to reduce foreign matters to the slide portion; to avoid insufficient lubrication in the solenoid portion which needs lubrication; (2) to reduce not smooth sliding motion of the cup guide and the plunger; and (3) to reduce abrasion on the cup guide and the plunger. As shown in FIGS. 6, 7 and 8, CMP1 has a spool valve 101, a solenoid 102, and a cup shaft 103. The spool valve 101 and the solenoid 102 are connected to have a common central axis. The cup shaft 103 is a member to transmit axial movement of the plunger 106 to the spool 105. The spool valve 101 has components such as a sleeve 104, the spool 105, and a spring 110.

The solenoid 102 has a plunger 106 made of magnetic material, a coil 107 which is excited by supplying current and magnetizes the plunger 106 to generate magnetic force to attract and move the plunger 106. The solenoid 102 has a yoke 108 which is disposed radial outside of the coil 107 and forms a magnetic path, and a stator core 109 which is disposed radial inside of the coil 107 and forms the magnetic path. The solenoid 102 has a cup guide 111 which is formed in a bottomed cylindrical shape and is disposed radial inside of the stator core 109, and a collar 112 disposed radial inside of the cup guide 111. The collar 112 is made of magnetic metal. The collar 112 is disposed to oppose a ring shaped front end surface of the plunger 106 at a radial inside of the cup guide 111. The collar 112 is disposed to increase magnetic force to attract the plunger 106.

When the solenoid 102 is activated, the coil 107 is supplied current from a solenoid driver circuit which is electrically controlled by an electric control unit (ECU). Current supplied to the coil 107 is a duty controlled switching current.

As shown in FIG. 8B, OCV makes the plunger 106 and the cup guide 111 movable each other by bringing them under the dynamic friction mode by using micro vibrations caused by a control frequency for the duty control. The control frequency may be referred to as a drive frequency, e.g., in a range from 250 Hz to 300 Hz. The micro vibrations may also be referred to as a dither vibration which may also mean the dynamic friction. In a case that frictional force acting on the plunger 106 is increased by a friction with the cup guide 111, it becomes impossible to maintain the dither vibration, which is almost equal to losing the dynamic friction. As a result, the plunger 106 and the cup guide 111 may fall into a stick-slip condition in which the plunger 106 and the cup guide 111 cyclically repeat the dynamic friction mode and the static friction mode.

FIG. 9A is a graph showing I-Q curve of a fine product. FIG. 9B is a graph showing I-Q curve of a bad product. I-Q stands for a current-flow amount curve. Current I (mA) is a solenoid driving current supplied to the coil 107 from the solenoid driver circuit. Flow amount Q (L/min) is a flow amount of oil. When OCV falls into the stick-slip condition, the I-Q curve shows a stepped change as shown in FIG. 9B.

Especially, OCV of CMP1 has a problem that a sticking occurs in a range where no oil is supplied to either advancing or retarding chambers when the duty ratio of the solenoid current is in a range of 40-60% and an average current is in a range of 400-600 mA, i.e., in a pressure regulating range where a pressure is regulated an flow amount of oil is not greater than 1.5 L/min.

FIG. 8A shows the cup guide 111. The cup guide 111 is formed in a bottomed cylindrical shape by carrying out press forming on a metal plate made of nonmagnetic material. The cup guide 111 has a flange 121, a tapered portion 122, a large cylindrical portion 123, and a small cylindrical portion 124. The flange 121 is formed in a ring shape and is disposed between a rear end of the sleeve 104 and a front end of the stator core 109 together with an O ring 113. The tapered portion 122 extends obliquely from a radial inside of the flange 121. The large cylindrical portion 123 is formed in a cylindrical shape and is disposed between an outer surface of the plunger 106 and an inner surface of the stator core 109. The small cylindrical portion 124 is formed in a bottomed cylindrical shape having a smaller diameter than the large cylindrical portion 123. The small cylindrical portion 124 is disposed between an outer surface of the plunger 106 and an inner surface of the stator core 109. A ring shaped step 125 is formed between the large cylindrical portion 123 and the small cylindrical portion 124.

Since an accuracy of press work product is usually less than a product manufactured by cut machining, and OCV of CMP1 is manufactured by press work, finishing and angles of the portions of CMP1, such as the flange 121 and the tapered portion 122, are not so fine. In a case that the finishing of the cup guide 111 is not fine, it is difficult to assemble the cup shaft 103 and the plunger 106 in a proper alignment. For example, the cup guide 111 may be inclined from the proper position at an assembling step. Then, the cup shaft 103 may be inclined by a certain angle with respect to a central axis CL1 of the spool 105 and a central axis of the plunger 106. As a result, the cup shaft 103 may be laterally shifted and may abut on the plunger 106 at an edge as shown in FIG. 10B.

In this case, as shown in FIG. 11, relatively large forces, such as side forces F1, F3, F6, and F7 may act on each corresponding portion. The side forces F1, F3, F6, and F7 are generated in a radial direction vertical to the central axis, i.e., a lateral direction of movable components, such as the spool 105 and the plunger 106. F2 is reaction force in a direction along the central axis acting on the spool 105 from the spring 110. F4 is a slanting load which is generated by an inclination of the cup shaft 103 and is acting on at least one of the spool 105 or the plunger 106. Fe is a load in a radial outside direction, i.e., a tangential direction, which is generated from the coil 107 while the coil 107 is excited by current.

As mentioned above, it may be assumed that a sticking on the I-Q curve may occur due to relatively large side forces acting on the movable member such as the spool 105 and the plunger 106. In addition, if accuracy requirements for the cup guide 111 are increased, it may be very hard to manufacture the cup guide 111 having the shape shown in FIG. 8B by using the press work. On the other hand, if the cut machining, which curves the cup guide 111 out from the bulk metal, is employed to manufacture the cup guide 111, manufacturing cost of OCV is increased.

It is an object of the present disclosure to provide an electromagnetic valve which can reduce a slanting load generated on the spool or the shaft due to an inclination of the shaft with respect to the central axis of the sleeve or the spool.

According to an aspect of the disclosure, an electromagnetic valve is provided. the electromagnetic valve has a spool valve having a sleeve formed in a cylindrical shape extending along a central axis from a base end to a distal end, and a spool supported within a spool bore formed in the sleeve in a reciprocally movable manner. The electromagnetic valve has a shaft disposed axially next to the spool to come into contact with the base end of the spool, and an electromagnetic actuator. The electromagnetic actuator has a stator core formed in a cylindrical shape and fixed on the base end of the sleeve, a cup guide formed in a bottomed cylindrical shape and disposed radial inside of the stator core, a movable core supported in a guide bore formed within the cup guide in a reciprocally movable manner and connected to the spool via the shaft in an integrally movable manner, and a coil excited by current to magnetize the movable core and the stator core. The shaft has a first stepped portion formed in a shape to provide a male-female joint. The first stepped portion is formed on a first end portion, which comes in contact with the movable core. The movable core has a second stepped portion formed in a shape to provide the male-female joint with the first stepped portion. The second stepped portion is formed on a second end portion, which comes in contact with the shaft.

According to an aspect of the disclosure, the first stepped portion on the shaft and the second stepped portion on the movable core are engaged by the male-female joint. Therefore, it is possible to reduce lateral offset of the shaft to the movable core and an inclination of the shaft to the movable core. Even if the finishing of the cup guide is the same as the comparative embodiment 1, it is possible to reduce slanting load generated on the spool or the shaft due to an inclination of the shaft with respect to the central axis of the spool. It is possible to reduce side forces. It is possible to reduce sticking of the plunger. As a result, it is possible to improve control ability of the movable components including the plunger, the shaft and the spool with respect to current supplied to the coil. In addition, the cup guide does not need high accuracy. Therefore, the cup guide may be manufactured by press work. It is also possible to reduce cost for manufacturing the cup guide and OCV.

According to another aspect of the disclosure, since two or more force transmitting points are provided, it is possible to reduce slanting load on the spool or the shaft caused by an inclination of the shaft with respect to the central axis of the sleeve or the spool. As a result, it is possible to reduce side forces. It is possible to reduce sticking of the plunger. As a result, it is possible to improve control ability of the movable components including the plunger, the shaft and the spool with respect to current supplied to the coil.

BRIEF DESCRIPTION OF THE DRAWINGS

The above and other objects, features and advantages of the present disclosure will become more apparent from the following detailed description made with reference to the accompanying drawings. In the drawings.

The above and other objects, features and advantages of the present disclosure will become more apparent from the following detailed description made with reference to the accompanying drawings. In the drawings.

DETAILED DESCRIPTION

First Embodiment

Figure 1:
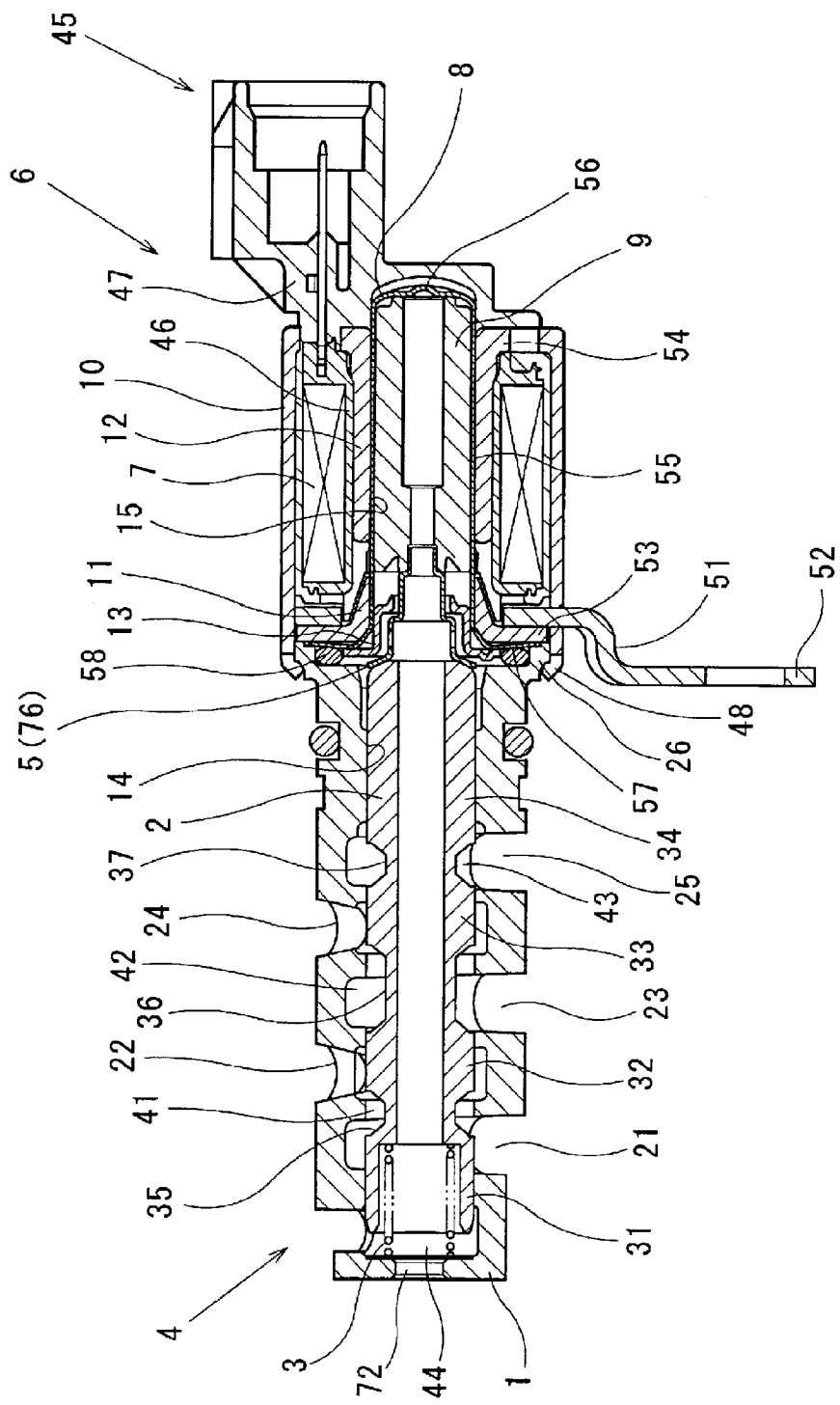
FIG. 1 is a cross sectional view of an electromagnetic oil control valve (OCV) according to a first embodiment.
Figure 2:
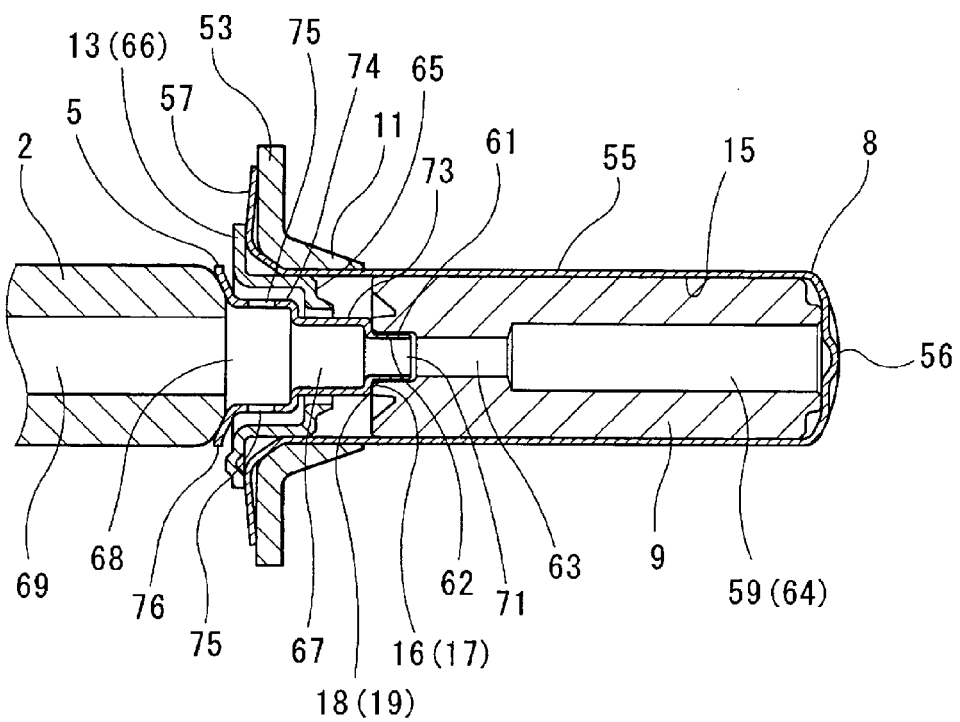
FIG. 2 is an enlarged cross sectional view of components in OCV.

Hereafter, the form of implementation of the present invention is explained in detail based on a drawing.

FIGS. 1 to 4 show an electromagnetic oil control valve (OCV) which is used as a component of a variable valve timing system for an internal combustion engine (ICE). OCV is operated to control oil flow supplied to and discharged from a variable valve timing mechanism (VVT).

The variable valve timing system includes VVT, an oil circuit, OCV, and an engine control unit (ECU). VVT may vary an opening timing and/or a closing timing of a valve of ICE in a continuously variable manner. The valve may be an intake valve, an exhaust valve or both of them. VVT may be disposed on a drive train for a camshaft for operating the valve. ICE may be mounted on a vehicle to move the vehicle. The oil circuit is arranged to control VVT. The oil circuit is arranged to supply oil to VVT and retrieve oil from VVT. OCV is installed in the oil circuit. ECU electrically controls OCV.

VVT may be a vane type hydraulic actuator. VVT has a shoe housing which is rotated in a synchronous manner with a crankshaft of ICE. VVT has a vane rotor which is disposed within the shoe housing in a relatively rotatable manner and is operatively connected with the camshaft in an integrally rotatable manner. VVT further has hydraulic actuators formed within the shoe housing. The hydraulic actuators may be provided by variable chambers defined between the shoe housing and the vane rotor. VVT rotates the camshaft in an advancing direction or retarding direction by rotating the vane rotor relatively to the shoe housing by using the hydraulic actuator.

The housing may be integrally connected with a sprocket which is jointed with the housing by a tightening member, such as a bolt, and is rotated by the crankshaft via a timing belt or chain. An inside of the housing defines a plurality of chamber recess having a fan shape. The housing may be rotated in a primary direction, such as the right hand direction. This primary direction may correspond to the advancing direction.

The vane rotor is positioned on an end of the camshaft at a predetermined position by using a positioning member, such as a pin. The vane rotor is fixed on the end of the camshaft by a tightening member, such as a bolt. The vane rotor rotates integrally and synchronously with the camshaft. The camshaft is rotatably supported in the cylinder head of ICE. The camshaft is operatively coupled with the crankshaft so that the camshaft rotates once for two rotations of the crankshaft. The camshaft is an intake camshaft or an exhaust camshaft. The camshaft has a plurality of cam portions. For example, the camshaft may have cam portions corresponding to the number of cylinders. Each cam portion has a cam profile which defines valve timing, such as valve opening timing and/or valve closing timing. Each cam portion operates an intake valve for opening and closing an intake port or an exhaust valve for opening and closing an exhaust port.

The vane rotor has at least one vane which partitions and divides the chamber defined within the shoe housing into a first pressure chamber and a second pressure chamber. The first pressure chamber and the second pressure chamber provide the advancing chamber and the retarding chamber. The vane rotor is disposed to the housing in a rotatable manner within a predetermined angular range. The vane rotor is rotatable in both directions. The advancing chamber is an advancing oil chamber to rotate the vane rotor in an advancing direction by oil pressure acting on both sides of the vane. The advancing chamber may be referred to as a first fluid chamber. The advancing chamber is defined within the chamber on the housing and is located on a side of the vane opposite to the rotating direction of the housing. The retarding chamber is a retarding oil chamber to rotate the vane rotor in a retarding direction by oil pressure acting on both sides of the vane. The retarding chamber may be referred to as a second fluid chamber. The retarding chamber is defined within the chamber on the housing and is located on a side of the vane on the rotating direction of the housing.

The oil circuit is a rotating power system which relatively rotates the vane rotor to the housing by generating pressure difference between the advancing chamber and the retarding chamber. The oil circuit generates the pressure difference by supplying oil to one of the advancing chamber and the retarding chamber and simultaneously discharging oil from the other one of the advancing chamber and the retarding chamber. The oil circuit has an oil pump which may be driven by ICE or electric motor. The oil circuit has a first chamber passage which is used to supply oil to the advancing chamber and is used to discharge oil from the advancing chamber. The oil circuit has a second chamber passage which is used to supply oil to the retarding chamber and is used to discharge oil from the retarding chamber. The oil circuit further has OCV which supply oil pressurized by the oil pump to the advancing chamber or the retarding chamber in a selectively switched manner.

The oil pump is a device to generate pressurized oil by sucking oil in an oil pan up. The oil pan is an oil reservoir where engine oil for lubricating ICE is reserved. The oil pan may be replaced by an oil tank. A discharge port of the oil pump is communicated with the oil supply passage. OCV, which is an electromagnetic valve, is disposed on a downstream end of the oil supply passage.

OCV has a spool valve 4, a cup shaft 5 made of nonmagnetic material, and an electromagnetic actuator 6. The spool valve 4 has a cylindrical sleeve 1, a cylindrical spool 2, and a spring 3. The electromagnetic actuator 6 is also referred to as a solenoid 6. OCV may also be referred to as an electromagnetic oil control valve or an electromagnetic spool control valve. OCV is provided by integrally connecting the spool valve 4 and the solenoid 6 in series along the central axis at a base end of the spool valve 4 and a distal end of the solenoid 6. The spool valve 4 has a sleeve 1 formed in a cylindrical shape extending along a central axis from a base end to a distal end. The spool valve 4 has a spool 2 supported within a spool bore 14 formed in the sleeve 1 in a reciprocally movable manner. The cup shaft 5 is disposed axially next to the spool 2 to come into contact with the base end of the spool 2. The solenoid 6 has components, such as a solenoid coil 7, i.e., coil 7, a cup guide 8 made of nonmagnetic material, a plunger 9, a yoke 10, stator cores 11 and 12, and a collar 13. The plunger 9, the yoke 10, the stator cores 11 and 12, and the collar 13 are made of magnetic material.

The cup shaft 5 is a power transmitting member which connects the spool 2 and the plunger 9 in an integrally movable manner. The cup shaft 5 is disposed axially next to the spool 2 to come into contact with the base end of the spool 2. The cup shaft 5 has the first stepped portion 16 formed in a shape to provide a male-female joint. The first stepped portion 16 is formed on a first end portion, which is come in contact with the plunger 9. The first stepped portion 16 defines a first end surface 17 which comes in contact with a front end of the plunger 9. The plunger 9 has a second stepped portion 18 formed in a shape to provide a male-female joint with the first stepped portion 16. The second stepped portion 18 is formed on a second end portion, which is come in contact with the cup shaft 5. The second stepped portion 18 defines a second end surface 19 which comes in contact with the cup shaft 5.

The sleeve 1 is inserted and fitted in a mounting bore which opens on a side surface of a cylinder head of ICE. The sleeve 1 is a cylindrical valve case axially extending along a central axis from the base end to the distal end. The base end is a connecting end to the solenoid. The distal end is an end for covering a spring. The sleeve 1 defines a plurality of ports 21-25 through which oil used for VVT flows. The ports 21-25 communicate a radial inside and a radial outside of the sleeve 1 in radial directions which are vertical to the central axis of the spool bore 14. The spool bore 14 extends along the central axis and is formed within the sleeve 1. The spool bore 14 supports the spool 2 in a manner that the spool 2 is freely slidable along the central axis. The spool bore 14 is a sliding bore on which the spool 2 slides directly.

The ports 21-25 are formed to allow oil supply and oil discharge for the advancing chamber and the retarding chamber. The ports 21-25 open in radial directions which are vertical to the central axis of the spool bore 14. The ports 21-25 are formed to open with predetermined distances between them along the central axis of the spool bore 14. The ports 21-25 includes an advancing drain port 21, an advancing output port 22, an oil supply port 23, a retarding output port 24, and a retarding drain port 25. The advancing drain port 21 may also be referred to as a first oil discharge port to discharge oil from the inside of the spool bore 14 to an oil pan. The advancing output port 22 outputs oil from the inside of the spool bore 14 to the advancing chamber. The oil supply port 23 may also be referred to as an input port through which oil is supplied from the oil pan to the inside of the spool bore 14 via a pump. The retarding output port 24 outputs oil from the inside of the spool bore 14 to the retarding chamber. The retarding drain port 25 may also be referred to as a second oil discharge port to discharge oil from the inside of the spool bore 14 to an oil pan.

The advancing drain port 21 is communicated to an oil pan via an advancing drain passage, i.e., a first drain passage. The advancing output port 22 is communicated to the advancing chamber via an advancing passage, i.e., a first chamber passage. The oil supply port 23 is communicated to an oil discharge opening of the oil pump via an oil supply passage. The retarding output port 24 is communicated to the retarding chamber via a retarding passage, i.e., a second chamber passage. The retarding drain port 25 is communicated to the oil pan via a retarding drain passage, i.e., a second drain passage.

The ports are provided by through holes having openings on radial outside surface of the sleeve 1. The ports are arranged in the following order from the distal end to the base end of the sleeve 1: the advancing drain port 21, the advancing output port 22, the oil supply port 23, the retarding output port 24, and the retarding drain port 25. The distal end of the sleeve 1 is shown on the left side in FIG. 1 and is an opposite end to the solenoid. The base end of the sleeve 1 is shown on the right side in FIG. 1 and is a close end to the solenoid. The base end of the sleeve 1 provides an opening end. A connecting end surface connected to the solenoid is formed on the base end of the sleeve 1. The sleeve 1 has a flange 26 formed in a ring shape extending on a radial outside of the connecting end surface.

The spool 2 has a plurality of large shaft portions 31-34 which have an outer diameter substantially corresponds to an inner diameter of a bore of the sleeve 1, i.e., inner diameter of the spool bore 14. The plurality of large shaft portions 31-34 controls communicating state among the ports 21-25. The large shaft portions 31-34 may be also referred to as first to fourth lands 31-34. Outer surface of the first to fourth lands 31-34 provides sliding surface which directly slide on an inner surface of the spool bore 14. The spool 2 has a small shaft portion 35 which connects the first land 31 and the second land 32 to move them together. The spool 2 has a small shaft portion 36 which connects the second land 32 and the third land 33 to move them together. The spool 2 has a small shaft portion 37 which connects the third land 33 and the fourth land 34 to move them together.

An advancing drain channel 41 is formed between an inner surface of the sleeve 1 and an outer surface on the small shaft portion 35 of the spool 2. The inner surface of the sleeve 1 is a wall surface defining the spool bore 14. The advancing drain channel 41 may also be referred to as a first oil discharge channel formed in a cylindrical shape. The advancing drain channel 41 communicates the advancing drain port 21 and the advancing output port 22 when the spool 2 is positioned at a default position.

A central channel 42 is formed between the inner surface of the sleeve 1 and an outer surface on the small shaft portion 36 of the spool 2. The central channel 42 communicates the advancing output port 22 and the oil supply port 23 when the spool 2 is positioned at a full stroke position. The central channel 42 may also be referred to as a first oil supply channel formed in a cylindrical shape, when the central channel 42 supply oil to the advancing output port 22.

The central channel 42 communicates the retarding output port 24 and the oil supply port 23 when the spool 2 is positioned at the default position. The central channel 42 may also be referred to as a second oil supply channel formed in a cylindrical shape, when the central channel 42 supply oil to the retarding output port 24.

A retarding drain channel 43 is formed between the inner surface of the sleeve 1 and the outer surface on the small shaft portion 37 of the spool 2. The retarding drain channel 43 may also be referred to as a retarding discharge channel formed in a cylindrical shape. The retarding drain channel 43 communicates the retarding output port 24 and the retarding drain port 25 when the spool 2 is positioned at the full stroke position.

The spring 3 is a compression coil spring which generates urging force for urging the spool 2 toward the base end of the sleeve 1. The spring 3 provides an urging device, i.e., a biasing device. The spring 3 always biases the spool 2 toward the base end, i.e., the default side or the solenoid side. The spring 3 is disposed within a spring chamber 44 for accommodating the spring 3. The spring 3 is disposed so that the spring 3 is always compressed between a wall surface, i.e., a spring seat, on the sleeve 1 and a wall surface, i.e., a spring seat, on the spool 2.

The solenoid 6 provides an electromagnetic actuator. The solenoid 6 has a stator core formed in a cylindrical shape and fixed on the base end of the sleeve 1. The solenoid 6 has a coil 7 to generate magnetic flux when excited by current. The solenoid 6 has a stator core, which has a radial outside core and a radial inside core. The radial outside core is made of magnetic material and is disposed on a radial outside of the coil 7 to provide a magnetic path on the radial outside of the coil 7. The radial outside core is provided by magnetic members, such as a yoke 10. The radial inside core is made of magnetic material and is disposed in a radial inside of the coil 7 to provide a magnetic path in the radial inside of the coil 7. The radial inside core is provided by magnetic members, such as members 11 and 12. The solenoid 6 has a connector 45 for providing external electrical connections between a pair of coil lead lines extending from the coil 7 and an external circuit.

The solenoid 6 has a cup guide 8, a plunger 9 and a collar 13. The cup guide 8 is made of nonmagnetic material and disposed radial inside of the members 11 and 12 for the stator core. The cup guide 8 is formed in a bottomed cylindrical shape. The plunger 9 provides a movable core. The plunger 9 is supported in a guide bore 15 formed within the cup guide 8 in a reciprocally movable manner. The plunger 9 is connected to the spool 2 via the cup shaft 5 in an integrally movable manner. The collar 13 is made of magnetic material and is disposed and inserted between a radial inside of the cup guide 8 and a radial outside of the cup shaft 5. The solenoid 6 has a coil 7 which can be excited by current to magnetize the plunger 9 and the stator core to move the plunger 9.

The coil 7 generates magnetic flux when the coil 7 is excited by being supplied current. The magnetic flux attracts the plunger 9 toward a magnetic attracting portion 11 of the stator core and the magnetic opposing portion 65 on the collar 13. The coil 7 provides a magnetic flux generating member to generate magnetic flux to move the plunger 9. The coil 7 is a magnetic force generating member to generate magnetic force to attract the plunger 9. The coil 7 has a wire having insulating layer. The coil 7 is wound on a bobbin 46 which has a cylindrical body and a pair of flanges and is made of insulating resin material. The wire is wound around the cylindrical body between the flanges for plural times. The coil 7 drives and moves the spool 2, the cup shaft 5, and the plunger 9 by magnetic force in a direction toward the distal end of the solenoid, i.e., the one direction which is a direction toward left side in the drawing. The solenoid 6 provides a magnetic circuit which makes magnetic flux passes through the plunger 9, the yoke 10, and the stator cores 11 and 12 in a concentrated manner.

The coil 7 has a coil portion wound on the bobbin 46 and a pair of lead lines extending from the coil portion. The pair of lead lines can be electrically connected to the external circuit, i.e., ECU including an external power source and an external control circuit, via terminals, i.e., external connection terminals, in the connector 45. An outside of the coil 7 is covered with a molding resin 47 which is a synthetic resin having insulating property. The molding resin 47 is also formed to provide a housing of the connector 45 which accommodates the terminals to expose the distal end of the terminals. The housing may be referred to as a connector case made of synthetic resin having insulating property.

The coil 7 is connected to the external power source, e.g., a battery on mounted on the vehicle via a solenoid driver circuit which is controlled by ECU. ECU is provided by a microcomputer having components at least including CPU, ROM, and RAM. ECU controls current supplied to the coil 7 by a duty ratio control. ECU controls axial position, i.e., lifting amount, of the spool 2 in a linear manner by carrying out variable control of current so that the advancing chamber and the retarding chamber receive oil pressure according to operating condition of ICE and angular phase of the camshaft is controlled continuously according to operating condition of ICE.

When the current is controlled by the duty ratio of 0% and is turned off, the spool 2 is positioned at the most left side in the drawing. In this mode, the spool 2 communicates between the advancing output port 22 and the advancing drain port 21, and communicates between the retarding output port 24 and the oil supply port 23.

When the current is controlled by the duty ratio of 100% and is turned on, the spool 2 is positioned at the most right position in the drawing. In this mode, the spool 2 communicates between the retarding output port 24 and the retarding drain port 25, and communicates between the advancing output port 22 and the oil supply port 23.

In other words, the greater the duty ratio the more advanced the valve timing of the intake valve, and the smaller the duty ratio the more retarded the valve timing of the intake valve. When the duty ratio is in a range from 40% to 60% and the spool 2 is positioned at a neutral middle position, OCV does not communicate the advancing output port 22 and the retarding output port 24 to any one of the advancing drain port 21, the oil supply port 23, and the advancing drain port 25. This neutral mode is a range where no oil is supplied to either the advancing chamber or the retarding chamber, i.e., a pressure regulating range in which pressure in the chambers are regulated while keeping a flow amount of oil not greater than 1.5 L/min.

The yoke 10 is made of magnetic metal, e.g., ferromagnetic materials, such as iron, which can be magnetized when the coil 7 is excited by current, and provides an outer stator core disposed radial outside of the coil 7. The yoke 10 has a cylindrical body which covers the perimeter side of the coil 7. The yoke 10 has finger tips 48 on an opening edge, i.e., the distal end side of the solenoid in the axial direction. The finger tips 48 are deformed to securely hold the flange 26 of the sleeve 1.

The stator core 11 and the stator core 12 provide an inner stator core disposed radial inside of the coil 7. The stator core 11 is a first stator core which is disposed to supply magnetic flux obliquely to the distal end of the plunger 9 and attracts the plunger 9 in a first direction, i.e., a direction toward the spool 2. The stator core 12 is a second stator core which is disposed to provide a cylindrical surface facing the radial outside surface of the plunger 9 to supply magnetic flux radially to the radial outside surface of the plunger 9.

The yoke 10 and the stator core 12 are formed integrally by a continuous material. In addition, the yoke 10 and the stator core 12 may be formed by separate components.

The stator cores 11 and 12 are made of magnetic metal, e.g., ferromagnetic material, such as iron, which can be magnetized when the coil 7 is supplied with current. The stator core 11 has a ring shaped flange 53 which is disposed between the sleeve 1 and the flange on the bobbin 46. The flange 53 is tightly sandwiched between the sleeve 1 and a circular ring portion 52 of a bracket 51 for securely fixing OCV on ICE or support member. The stator core 12 has a cylindrical portion and a flange 54. The cylindrical portion is disposed to cover the radial outside of the plunger 9 through the cylindrical portion of the cup guide 8. The flange 54 is formed to extend from a rear end of the cylindrical portion toward outside in a radial direction, and is magnetically connected with the yoke 10. The cylindrical portion of the plunger 9 and the cylindrical portion of the stator core 12 define a cylindrical clearance which may be referred to as a magnetic flux passing gap or a side gap. In the illustrated embodiment, the stator cores 11 and 12 are provided by separate members. Alternatively, the stator cores 11 and 12 may be provided by an integrally formed single component.

The cup guide 8 is made of nonmagnetic material, such as a thin stainless sheet. The cup guide 8 has a cylindrical plunger guide 55, i.e., a cylindrical side wall, which is disposed between the cylindrical portion of the stator cores 11 and 12 and the cylindrical portion of the plunger 9. The cup guide 8 is disposed to prevent oil leak from the inside of the solenoid 6 to the outside, i.e., from the plunger side to the stator core side. The guide bore 15 is formed on an inside of the plunger guide 55. The guide bore 15 has a cross section which allows the radial outside surface of the plunger 9 directly slides on the guide bore 15.

The cup guide 8 is formed in a bottomed cylindrical shape which has the plunger guide 55, a bottom wall 56 and a flange 57. The plunger guide 55 is formed to open at one end to face to the spool bore 14. This opening end is enlarged to provide the flange 57. The plunger guide 55 is closed at the other end, i.e., on the base end side of the solenoid 6, by the bottom wall 56. The flange 57 is integrally formed with the plunger guide 55. The flange 57 is outwardly extends from the opening of the plunger guide 55. The flange 57 is disposed on the front side to the flange 53 on the stator core 11. The flange 57 is fixed by tightly sandwiched between the flange 53 and the connecting end surface on the sleeve 1. An O ring 58 is disposed between the flange 57 and the connecting end surface.

The plunger 9 is disposed within a radial inside of the cup guide 8 for providing oil seal in a reciprocally slidable manner in an axial direction of the solenoid 6. The plunger 9 is made of magnetic metal, e.g., ferromagnetic material, such as iron, which is magnetized when the coil 7 is excited by current. The plunger 9 is a movable core, i.e., a moving core, which can be attracted in the one direction along the axis of the solenoid 6 by magnetic force of the coil 7. The plunger 9 is urged and biased toward the bottom wall 56 by the spring 3 together with the spool 2 and the cup shaft 5.

The plunger 9 has a plunger breather port 59. The plunger breather port 59 is formed in the plunger 9 along the central axis of the solenoid. The plunger breather port 59 communicates both ends of the plunger 9, i.e., both front and rear end in the axial direction of the plunger 9. The plunger breather port 59 allows flow of oil in a plunger back space, i.e., a first variable volume portion, caused by a displacement of the plunger 9 within the cup guide 8 and the stator core 12.

The plunger breather port 59 is an axial bore with stepped inner surface. The plunger breather port 59 has a recess 62, a small bore 63 and a large bore 64, which are axially arranged in this order. The recess 62 is placed on the front end of the plunger 9 and is formed in a shape to provide a male-female joint with the projection 61 on the cup shaft 5. The recess 61 is a circular bore. The small bore 63 is placed on the middle of the plunger 9 and is formed to have a smaller diameter than the recess 62. The large bore 64 is placed on the rear end of the plunger 9 and is formed to have a larger diameter than the small bore 63. The plunger 9 is explained in detail later.

The collar 13 is a magnetic component made of a magnetic metal, e.g., ferromagnetic materials, such as iron, which is formed and disposed to face the front end of the plunger 9 to increase magnetic attracting force. The collar 13 has a cylindrical portion, a magnetic opposing portion 65, and a projection. The cylindrical portion is disposed on a radial outside of a large cylindrical portion on the cup shaft 5. The magnetic opposing portion 65 is formed in a ring shape and is disposed on the distal end of the cylindrical portion to axially oppose the front end of the plunger 9. The projection is axially projected in one direction from a radial inside portion of the magnetic opposing portion 65. The collar 13 is generally formed in a cylindrical shape defining an opening on the front side, i.e., on a side to face the spool 2. The collar 13 has a ring shaped flange 66 which is integrally formed with the magnetic opposing portion 65. The flange 66 is formed on a radial outside of an outer rim of the opening. The flange 66 is disposed on a front side of the flange 53 on the stator core 11 and on a front side of the flange 57 on the cup guide 8.

The cup shaft 5 is a member which transmits driving force generated by the plunger 9 in one direction along the central axis of the solenoid to the spool 2. In addition, the cup shaft 5 is also a member which transmits urging force applied to the spool 2 by the spring 3 to the plunger 9. The cup shaft 5 is a hollow component which is manufactured by forming a metal plate made of nonmagnetic material, e.g., stainless steel plate etc., into a cup shape, i.e., a bottomed cylindrical shape, which has an opening on one end in the axial direction and a closed bottom on the other end in the axial direction.

The cup shaft 5 defines a hollow portion 67, which is space, therein. The hollow portion 67 communicates with a spool breather port 69, i.e., an axial bore, which axially penetrates the center of the spool 2, via an opening 68 formed on the one axial end, i.e., opening end, of the cup shaft 5. The hollow portion 67 communicates with a plunger breather port 59, which axially penetrates the center of the plunger 9, via a communicating aperture 71 formed on the other axial end, i.e., bottom wall, of the cup shaft 5.

The spool breather port 69 presents and is formed in a three-stepped bore shape which has a small diameter bore, a middle diameter bore, and a large diameter bore. The plunger back space, i.e., the first variable volume portion, is defined on a side to a bottom wall of the cup guide 8 than the plunger 9. The sleeve 1 has a distal end wall which defines a spring chamber 44 with the spool 2. An oil discharging port 72 is formed on the distal end wall. The plunger back space and the oil discharging port 72 are communicated via the plunger breather port 59, the hollow portion 67, and the spool breather port 69 in this order. The oil discharging port 72 is an opening for discharging oil to an outside of OCV.

The plunger 9 is formed with the second end surface 19 which is formed in a ring shape and in contact with the first end surface 17 of on the cup shaft 5. The cup shaft 5 is formed in a three-stepped cylindrical shape which has a projection 61, a cylindrical side wall 73 and a cylindrical side wall 74. The projection 61 is formed in a shape which is capable of being inserted into the recess 62 formed on the plunger 9. The cylindrical side wall 73 is formed with a larger diameter than the projection 61 and is placed radial inside of the magnetic opposing portion 65. The cylindrical side wall 74 is formed with a larger diameter than the cylindrical side wall 73 and extends to surround the radial outside of a rear end of the spool 2. The side wall 73 and 74 may be referred to as a cylindrical portion extending along the central axis of the cup shaft 5.

The cylindrical side wall 74 of the cup shaft 5 defines an oil discharging aperture 75 which penetrates the cylindrical side wall 74 in a radial direction and communicates a radial inside of the cup shaft 5 and a radial outside of the cup shaft 5. The oil discharging aperture 75 is a communicating aperture which communicates a radial inside of the cup shaft 5 and a radial outside of the cup shaft 5.

A flange 76 is disposed on a front end, i.e., a distal end, of the cup shaft 5. The flange is formed in a ring shape to come in contact with a rear end surface on the base end of the spool 2. Alternatively, the flange 76 may be formed in a circular truncated cone shape.

A plunger front space, i.e., a second variable volume portion, is defined between the spool 2 and the plunger 9. The plunger front space and the oil discharging port 72 are communicated via the oil discharging aperture 75, the hollow portion 67, and the spool breather port 69.

The hollow portion 67, the spool breather port 69, and the oil discharging aperture 75 provides a drain passage which communicates the variable volume portion and the oil discharging port 72.

By turning current supply to the coil 7 on by ECU, OCV is turned to an advancing control mode in which a position of the spool 2 is set to an advancing position by magnetic force generated by the coil 7. In this advancing control mode, oil is supplied from the oil pump to the advancing chamber via the oil supply passage, OCV, and the first chamber passage. In OCV, oil flows through the oil supply port 23, the central channel 42, and the advancing output port 22. In this advancing control mode, oil is discharged from the retarding chamber to the oil pan via the second chamber passage, OCV, and the drain passage. In OCV, oil flows through the retarding output port 24, the retarding drain channel 43, and the retarding drain port 25.

By turning current supply to the coil 7 off by ECU, magnetic force generated by the coil 7 is disappeared. OCV is turned to a retarding control mode in which a position of the spool 2 is set to a retarding position by biasing force of the spring 3. In this retarding control mode, oil is supplied from the oil pump to the retarding chamber via the oil supply passage, OCV, and the second chamber passage. In OCV, oil flows through the oil supply port 23, the central channel 42, and the retarding output port 24. In this retarding control mode, oil is discharged from the advancing chamber to the oil pan via the first chamber passage, OCV, and the drain passage. In OCV, oil flows through the advancing output port 22, the advancing drain channel 41, and the advancing drain port 21.

Details of Cup Shaft 5 and Plunger 9 are also shown in FIGS. 1 to 6.

The cup shaft 5 has a first stepped portion 16 on a first end portion of the cup shaft 5. The first stepped portion 16 is formed in a shape to provide a male-female joint. The first stepped portion is formed to come in contact with a front end of the plunger 9. The first stepped portion 16 has a first axial end surface 17, which is formed in a ring shape, and a projection 61, which is projected from a radial inside of the first axial end surface 17 in one direction along the central axis. The first axial end surface 17 and the projection 61 are integrally and continuously formed with the same material. In other words, the first stepped portion 16 is defined by the first axial end surface 17 and the projection 61 thereon.

The projection 61 is a projecting head portion of the cup shaft 5. The projection 61 is formed with a communicating aperture 71. The communicating aperture 71 communicates between the hollow portion 67 and the plunger breather port 59. The first axial end surface 17 is a stepped surface formed between the projection 61 and the side wall 73.

The plunger 9 has a second stepped portion 18 on a first end portion of the plunger 9. The second stepped portion 18 is formed in a shape to provide a male-female joint with the first stepped portion 16. The second stepped portion 18 is formed to come in contact with a rear end of the cup shaft 5. The second stepped portion 18 has a second axial end surface 19 and a recess 62. The second axial end surface 19 is formed in a ring shape and comes in contact with the first axial end surface 17. The recess 62 is extended from a radial inside of the second axial end surface 19 in the same direction as the projecting direction of the projection 61. The recess 62 provides the male-female joint with the projection 61. In other words, the second stepped portion 18 is defined by the second axial end surface 19 and the recess 62 on the center of the second axial end surface 19.

The recess 62 is disposed on a front side of the plunger breather port 59. The recess 62 may be referred to as a recessed groove or an axial hole which opens at the radial inside of the second axial end surface 19 and straightly extends from the opening side toward back side, i.e., toward a side to the small bore 63. The second axial end surface 19 is a stepped surface, i.e., a front end surface, formed on a front end of the plunger 9 in a ring shape. The front end of the plunger 9 may also be referred to as an opening rim portion.

The front end of the plunger 9 further has a groove 20 on a radial outside of the second axial end surface 19. The groove 20 is formed in an annular groove. Alternatively, the groove 20 may be provided by short grooves arranged in a circular shape with predetermined intervals. The groove 20 is provided to prevent interference between the plunger 9 and a projection on the collar 13, when the plunger 9 moves to the distal end side, i.e., a direction to advance the camshaft.

Figure 3A:
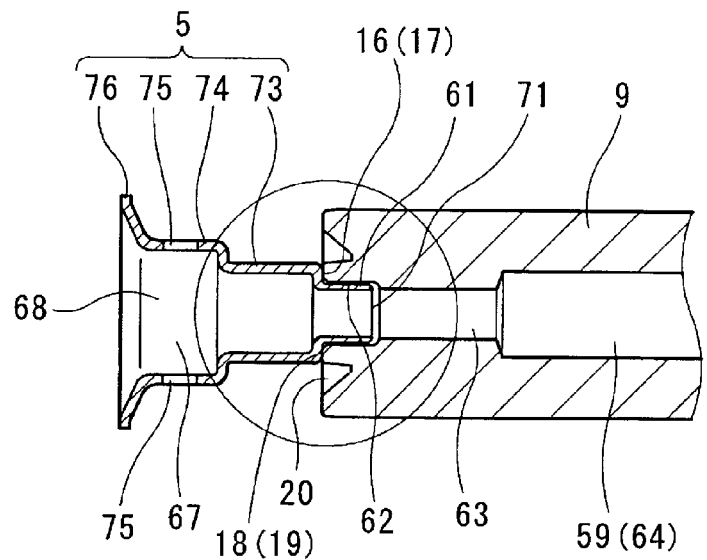
FIG. 3A is an enlarged cross sectional view of components in OCV.
Figure 3B:
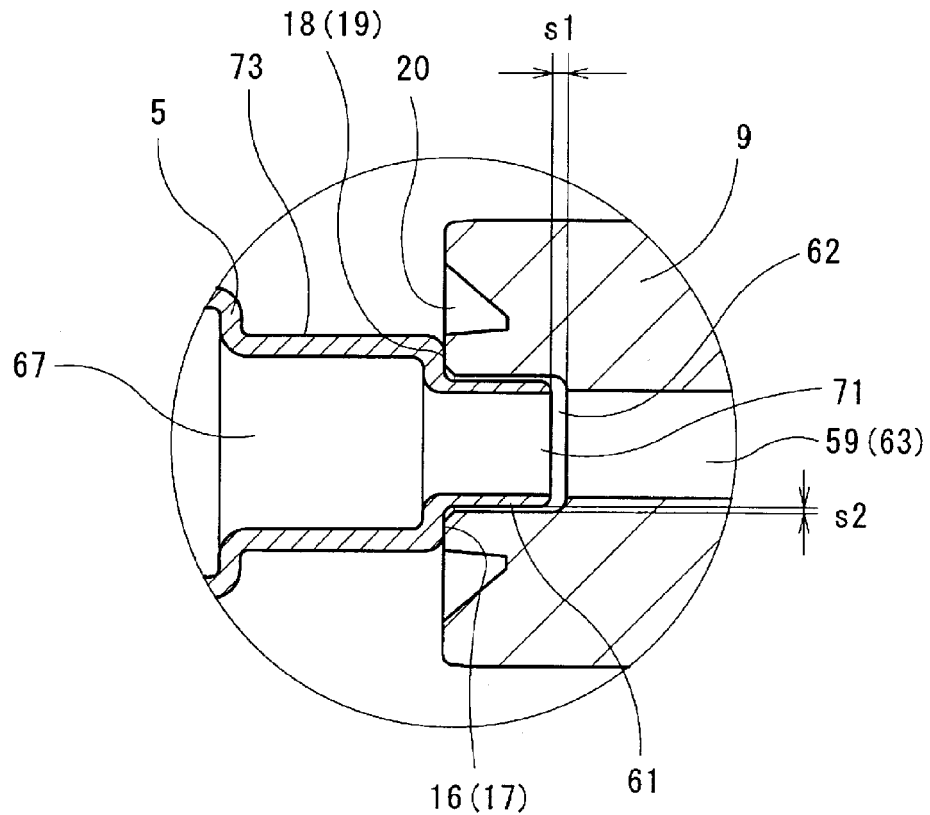
FIG. 3B is an enlarged view of an area indicated by a circle in FIG. 3A.

The male-female joint is provided by a loose joint which defines small clearances S1 and S2 between the projection 61 and the recess 62. That is, fitting state between the projection 61 and the recess 62 is not press fitting in which the projection 61 is tightly inserted into the recess 62. As shown in FIG. 3B, in a case that the cup shaft 5 and the plunger 9 are positioned with no eccentricity, the distal end surface of the projection 61 and the bottom surface of the recess 62 defines a small clearance S1 between them. The side surface of the projection 61 and the side surface of the recess 62 define a small clearance S2 between them. The side surface of the projection 61 is an outer circumferential surface. The side surface of the recess 62 is side surfaces on a groove for the recess 62.

Figure 4:
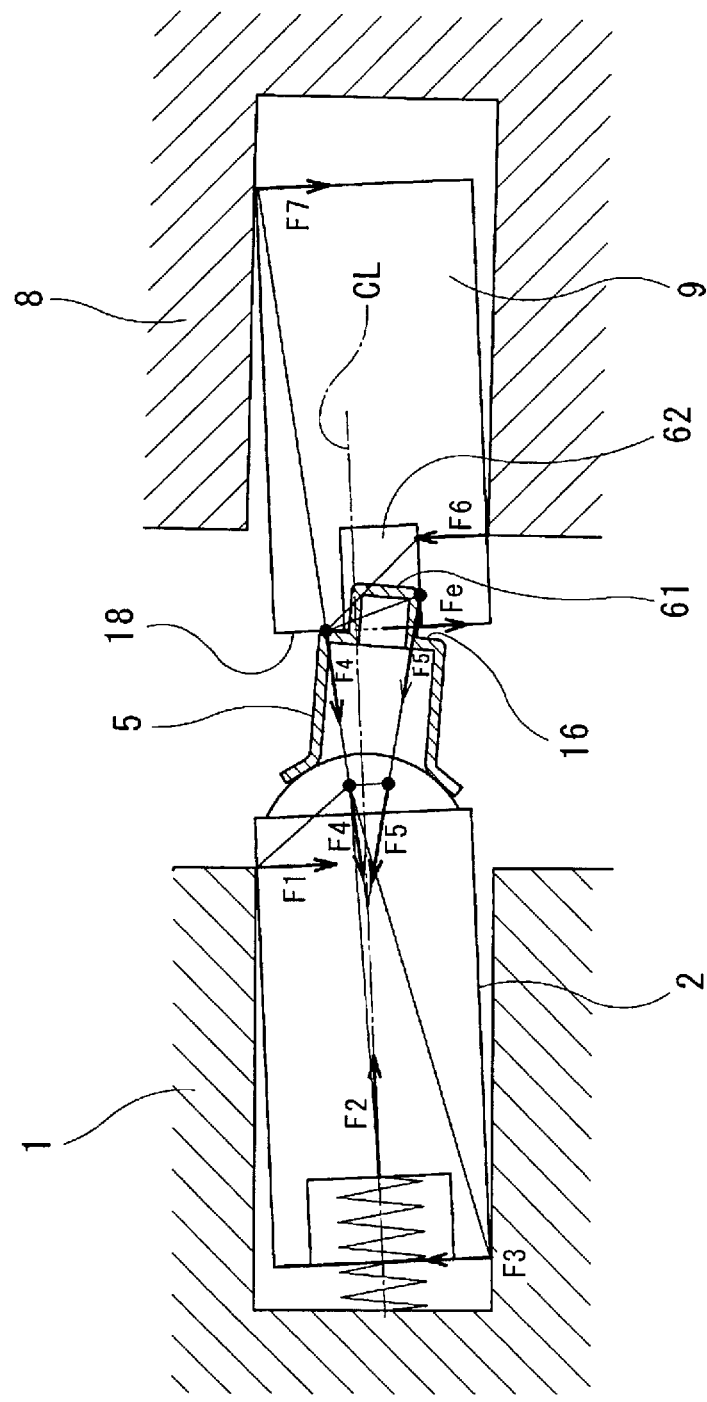
FIG. 4 is a schematic view showing side forces acting on OCV.

As shown in FIG. 4, the projection 61 and the recess 62 provides a structure which provides two or more force transmitting points from the movable core to the shaft, when the projection and the recess are inclined with each other. The force transmitting points are located on both sides of the central axis of the spool. In other words, two or more force transmitting points are located about the central axis of the spool in a distributed manner. The force transmitting points are symmetrically distributed with respect to an inclining axis.

In operation, the variable valve timing system changes valve timing. When ECU control VVT to advance the camshaft in accordance with engine operation condition, ECU increases the duty ratio of the current supplied to OCV. In this mode, ECU may control the duty ratio in a range from 80% to 100%, and current in a range from 800 mA to 1000 mA. Then, the coil 7 increases the magnetic force in accordance with increased current, the spool 2, the cup shaft 5 and the plunger 9 moves toward the distal end side.

As the spool 2 moves in the one direction, the spool 2 shuts a communication between the advancing drain port 21 and the advancing output port 22 out and opens a communication between the advancing output port 22 and the oil supply port 23. Simultaneously, the spool 2 shuts a communication between the oil supply port 23 and the retarding output port 24 out and opens a communication between the retarding output port 24 and the retarding drain port 25.

As a result, since the oil discharged from the outlet of the oil pump is supplied to the advancing chamber via OCV, an oil pressure in the advancing chamber is increased. Since the oil discharged from the retarding chamber is discharged to the oil pan, an oil pressure in the retarding chamber is decreased. Therefore, since the vane rotor is relatively displaced in an advancing direction to the shoe housing, VVT rotates the camshaft in the advancing direction.

When ECU control VVT to retard the camshaft in accordance with engine operation condition, ECU decreases the duty ratio of the current supplied to OCV. In this mode, ECU may control the duty ratio in a range from 0% to 30%, and current in a range from 0 mA to 300 mA. Then, the coil 7 decreases the magnetic force in accordance with decreased current, the spool 2, the cup shaft 5 and the plunger 9 moves toward the base end side by the spring 3. Similarly, the coil 7 does not generate the magnetic force in accordance with zero current, the spool 2, the cup shaft 5 and the plunger 9 moves toward the base end side by the spring 3.

As the spool 2 moves in the other direction, the spool 2 opens the communication between the advancing drain port 21 and the advancing output port 22 and shuts the communication between the advancing output port 22 and the oil supply port 23 out. Simultaneously, the spool 2 opens the communication between the oil supply port 23 and the retarding output port 24 and shuts the communication between the retarding output port 24 and the retarding drain port 25 out.

As a result, since the oil discharged from the outlet of the oil pump is supplied to the retarding chamber via OCV, an oil pressure in the retarding chamber is increased. Since the oil discharged from the advancing chamber is discharged to the oil pan, an oil pressure in the advancing chamber is decreased. Therefore, since the vane rotor is relatively displaced in a retarding direction to the shoe housing, VVT rotates the camshaft in the retarding direction.

As mentioned above, in OCV of this embodiment, the projection 61 on the first stepped end 16 of the cup shaft 5 and the recess 62 on the second stepped end 18 of the plunger 9 are engaged by the male-female joint. In contrast, in OCV of CMP1, the cup shaft 103 and the plunger 106 come in contact with surfaces perpendicular to the central axis. Therefore, in this embodiment, it is possible to reduce lateral offset and inclination of the cup shaft 5 with respect to the plunger 9. In this embodiment, the cup shaft 5 and the plunger 9 are connected at the first end and the second end in an integrally movable manner. Therefore, it is possible to transmit axial movement of the plunger 9 to the spool 2 effectively.

As shown in FIG. 4, OCV has a structure which provides two or more force transmitting points from the plunger 9 to the cup shaft 5. The force transmitting points are located about the central axis of the spool. The force transmitting points are located on both sides of the central axis CL of the spool 2. According to this structure, it is possible to reduce slanting forces F4 and F5 acting on the spool 2 or the cup shaft 5 due to an inclination of the cup shaft 5 with respect to the central axis of the sleeve 1 or the spool 2, even in a case that the projection 61 on the cup shaft 5 is engaged with the recess 62 of the plunger 9 in a slanting manner.

By reducing the side forces F1, F3, F6, and F7, it is possible to realize an improved I-Q curve in which less sticking point or no sticking point is generated within a range in which a pressure is regulated and a flow amount of oil is not greater than 1.5 L/min. Since it becomes possible to improve controllability of the plunger 9, the cup shaft 5, and the spool 2 to the current supplied to the coil 7, it is possible to improve controllability of VVT with respect to operating condition of the vehicle.

Here, F1 is a load of the radial inner side, which is side force generated mechanically and acts on the spool 2 from the sleeve 1, when the spool 2 inclines to the central axis of the sleeve 1.

F2 is a spring load, which is an axial load, i.e., force acting toward the base end side on the central axial of the spool 2, which the spool 2 receives from the return spring 3, when the spool 2 inclines to the central axis.

F3 is a load, which is side force generated mechanically, of the radial inner side which the spool 2 receives from the sleeve 1, when the spool 2 inclines to the central axis.

F4 is a slanting load which the cup shaft 5 receives from the plunger 9, when the cup shaft 5 inclines and an outer ridge between the projection 61 of the cup shaft 5 and the side wall 73 touches the second end face 19 of the plunger 9.

F5 is a slanting load which the cup shaft 5 receives from the plunger 9, when the cup shaft 5 inclines and the ridge of the projection 61 touches the side face of the recess 62 on the plunger 9.

F6 is a load of the radial inner side, which is side force generated mechanically and acts on the plunger 9 from the cup guide 8, when the plunger 9 inclines and the ridge of the cup guide 8 touches the peripheral surface, i.e., radial side face of the plunger 9.

F7 is a load of the radial inner side, which is side force generated mechanically and acts on the plunger 9 from the cup guide 8, when the plunger 9 inclines and the ridge of the plunger 9 touches the inner circumferential side of the plunger guide 55 of the cup guide 8.

Fe is a load of the radial outer side, i.e., tangential direction, which is side force generated by the magnetism of the coil 7, generated from the coil 7, while the coil 7 is excited by current.

According to the embodiment, it is possible to reduce one of the slanting loads F4 and F5 acting on the spool 2 or cup shaft 5 caused by an inclination of the cup shaft 5 with respect to the central axis of the sleeve 1 or the spool 2, even if finishing, i.e., an accuracy in shape or surface roughness, of the cup guide 8 is similar to CMP1. Therefore, it is not necessary to improve accuracy of the cup guide 8. It is possible to manufacture the cup guide 8 by using pressing machine for forming the cup guide 8 from a plate. Thereby, it is possible to down cost for manufacturing OCV.

Second Embodiment

Figure 5A:
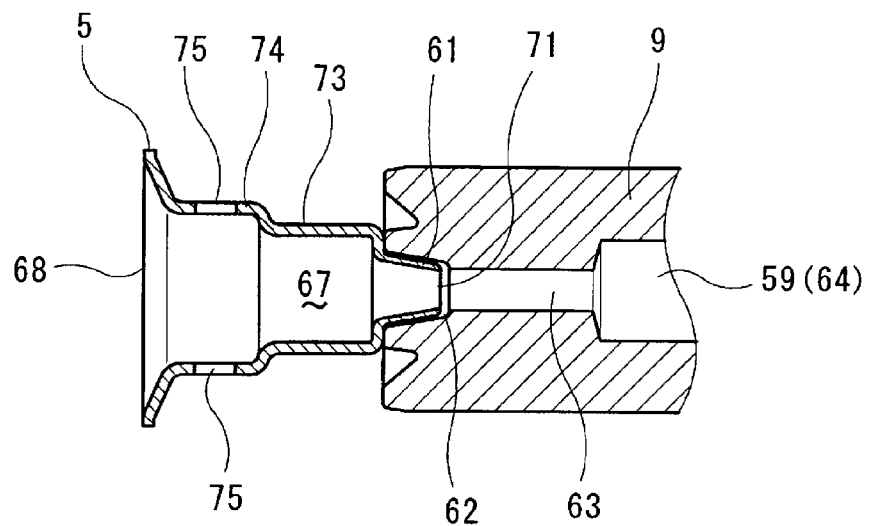
FIG. 5A is an enlarged cross sectional view of components in OCV according to a second embodiment.

FIG. 5A shows OCV of a second embodiment. The same reference symbols as in the first and second embodiments are used to show the same or equivalent components of which descriptions can be found above.

The projection 61 on the cup shaft 5 has a tapered profile. The tapered profile on the projection 61 provides two or more force transmitting points from the plunger 9 to the cup shaft 5. The force transmitting points are apart from each other and located on both sides of the central axis CL of the spool 2. The projection 61 is formed to have a tapered profile defining gradually decreasing outer diameter from a base to a distal end of the projection 61. The recess 62 is formed to have a tapered inner profile which corresponds to the tapered profile of the projection 61. The recess 62 may be formed to have a slightly larger inner diameter than the outer diameter of the projection 61, when the cup shaft 5 rests on the plunger 9. As mentioned above, this OCV has similar advantages as described in the preceding embodiment.

Third Embodiment

Figure 5B:
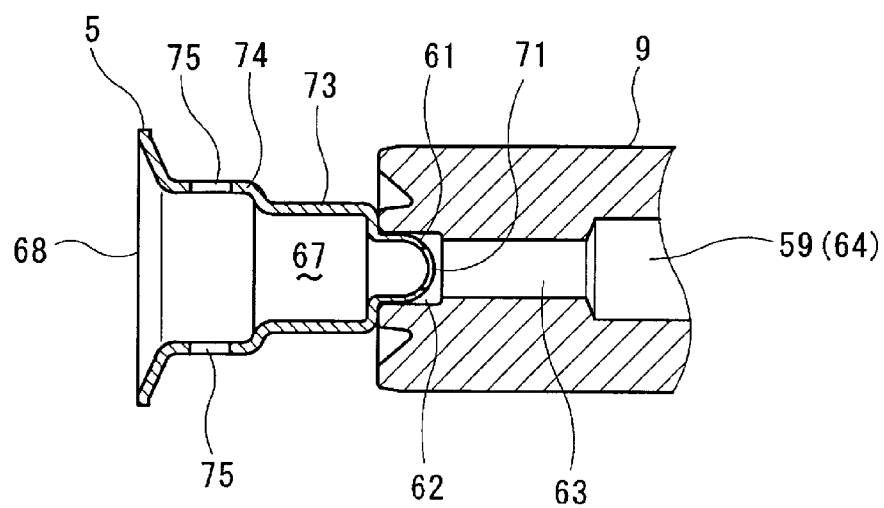
FIG. 5B is an enlarged cross sectional view of components in OCV according to a third embodiment.
Figure 6:
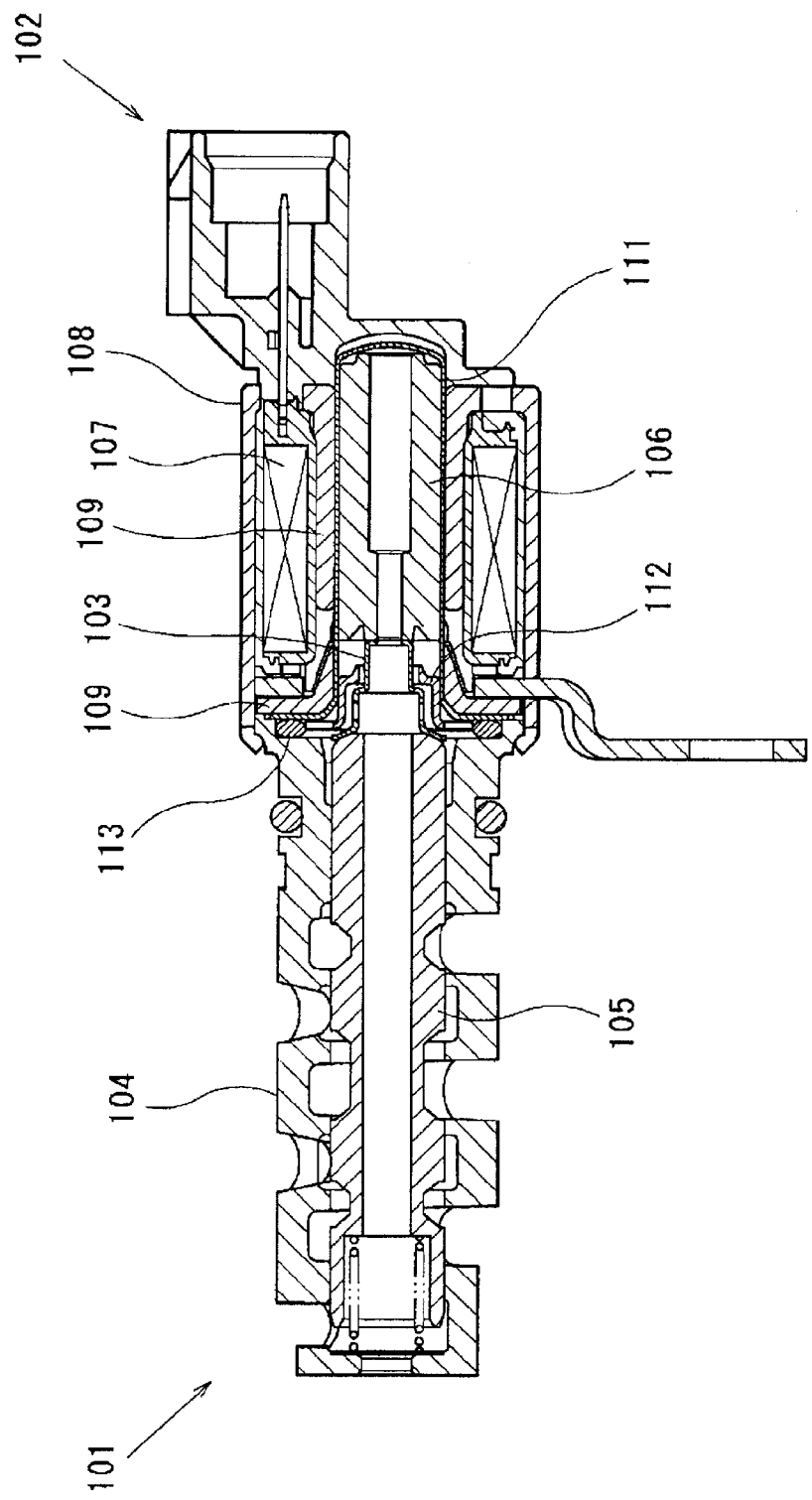
FIG. 6 is a cross sectional view of OCV according to a comparative embodiment.
Figure 7:
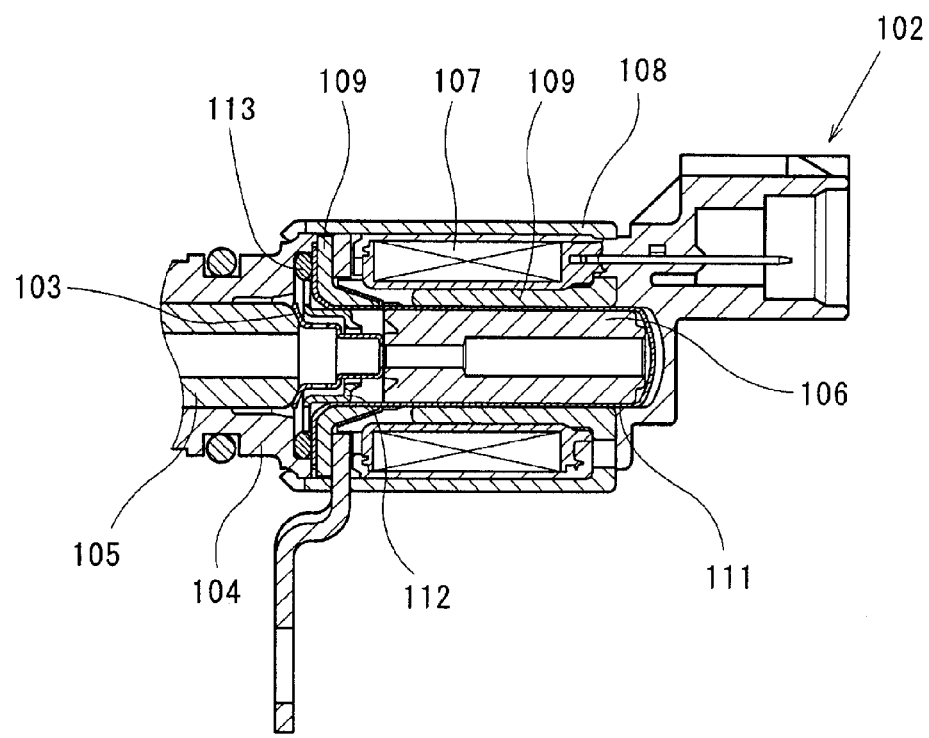
FIG. 7 is a partial cross sectional view of OCV shown in FIG. 6.
Figure 8A:
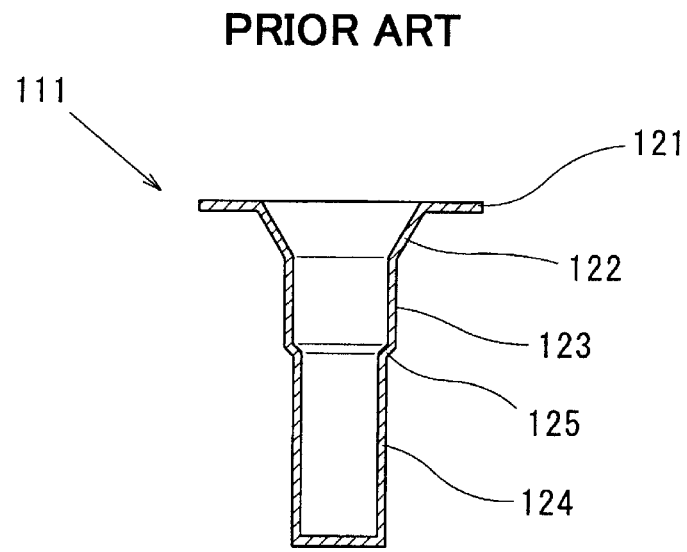
FIG. 8A is an enlarged cross sectional view showing a cup guide.
Figure 8B:
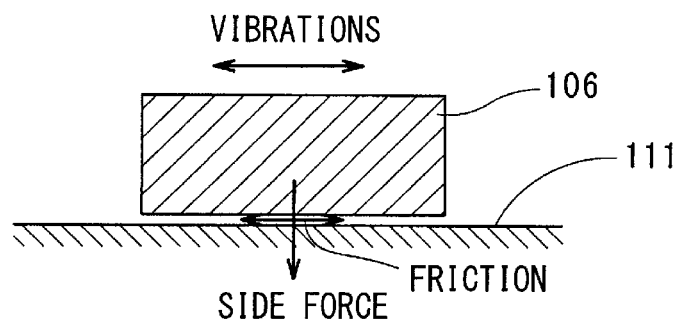
FIG. 8B is a diagram showing a friction model.
Figure 9A:
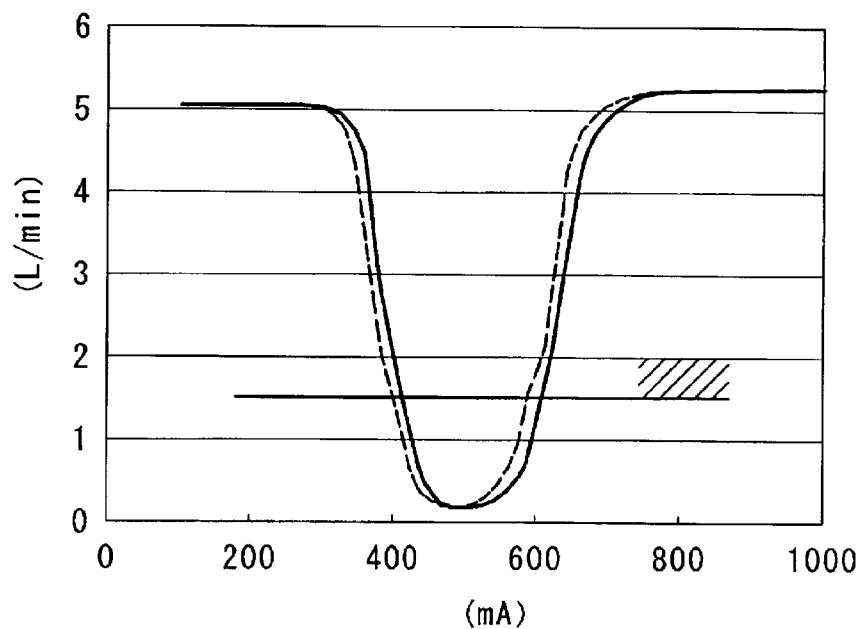
FIG. 9A is a graph showing an I-Q curve of a fine product.
Figure 9B:
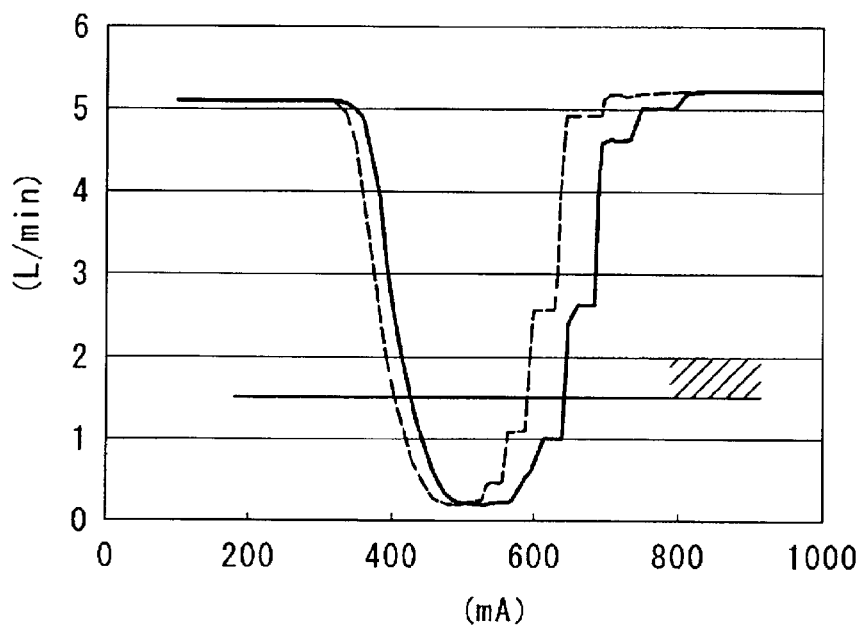
FIG. 9B is a graph showing an I-Q curve of a bad product.
Figure 10A:
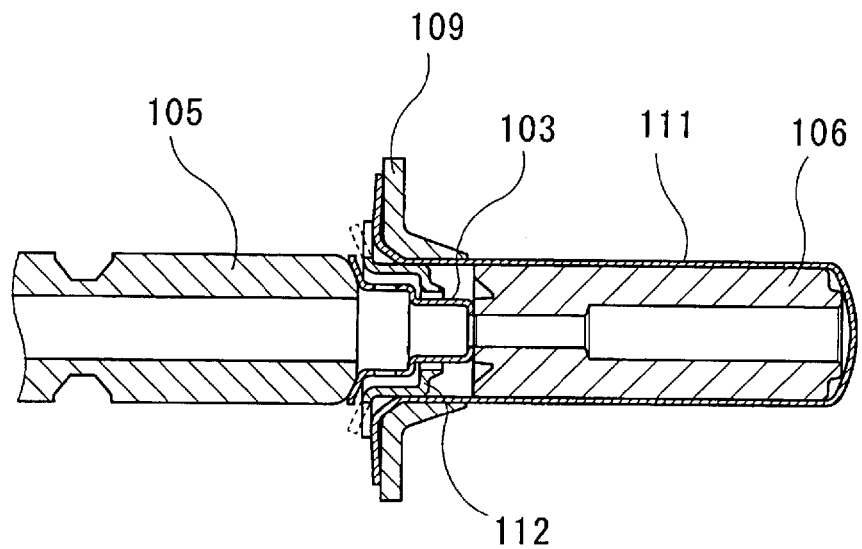
FIG. 10A is an enlarged cross sectional view of components in OCV shown in FIG. 6.
Figure 10B:
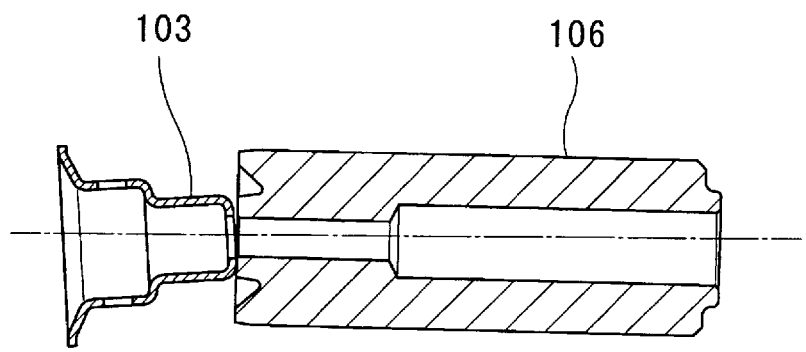
FIG. 10B is an enlarged cross sectional view showing relatively inclined components in OCV shown in FIG. 6.
Figure 11:
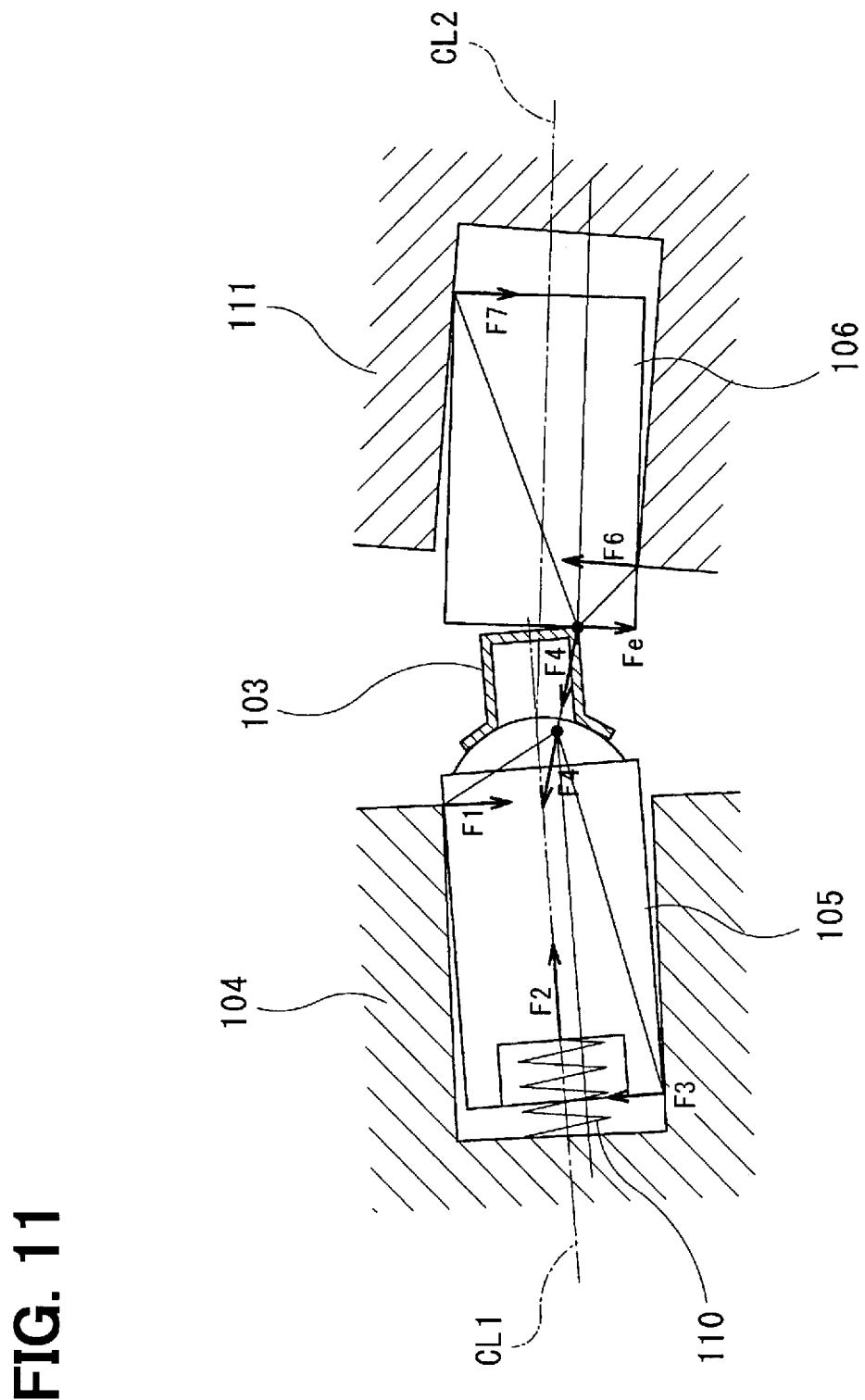
FIG. 11 is a schematic view showing side forces acting on OCV shown in FIG. 6.

FIG. 5B shows OCV of a third embodiment. The same reference symbols as in the first and second embodiments are used to show the same or equivalent components of which descriptions can be found above.

The projection 61 on the cup shaft 5 has a curved profile. The curved profile on the projection 61 provides two or more force transmitting points from the plunger 9 to the cup shaft 5. The force transmitting points are apart from each other and located on both sides of the central axis CL of the spool 2. The curved profile is provided by a spherical profile which has a predetermined radius having a center on a point located on the central axis of the cup shaft 5. The recess 62 on the plunger 9 presents the same profile as described in the first embodiment. As mentioned above, this OCV has similar advantages as described in the preceding embodiments.

Other Embodiments

In the illustrated embodiments, the electromagnetic valve according to the present disclosure is applied to OCV which may be used and assembled in the hydraulic circuit which controls oil pressure for VVT.

Alternatively, the present disclosure may be applied to provide an electromagnetic oil control valve which may be used and assembled in an oil pressure control device for performing oil pressure control for an automatic transmission for vehicle.

Alternatively, the present disclosure may be applied to provide an electromagnetic flow amount control valve, an electromagnetic flow channel switching control valve, or an electromagnetic pressure control valve.

Alternatively, the electromagnetic valve according to the present disclosure may be applied to valves which handle any fluid, including fuel to be supplied to an internal combustion engine, lubricant to be supplied to a friction part in an internal combustion engine or transmission, and working fluid, e.g., ATF for an automatic transmission.

In the above-mentioned embodiments, the first stepped portion 16 has the first axial end surface 17 and the projection 61. The second stepped portion 18 has the second end surface 19 and the recess 62.

Figure 12:
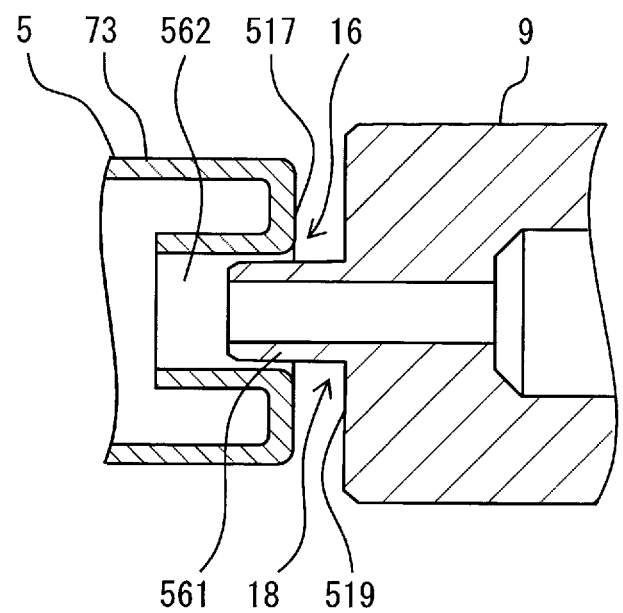
FIG. 12 is an enlarged cross sectional view of components in OCV according to one of other embodiments.

Alternatively, the first stepped portion 16 and the second stepped portion 18 may provide the male-female joint as shown in FIG. 12. In this arrangement, the first stepped portion 16 has a first axial end surface 517 and a recess 562. The second stepped portion 18 has a second axial end surface 519 and a projection 561.

The first axial end surface 517 is formed in a ring shape and is formed to come in contact with the plunger 9 at the second axial end surface 519. The second axial end surface 519 is formed in a ring shape and is formed to come in contact with the cup shaft 5 at the first axial end surface 517. The recess 562 is formed to extend from a radial inside edge of the first axial end surface 517 in one direction along the central axis. The recess 562 is formed as a hole defined by a pipe extending from the radial inside edge of the first axial end surface 517. The recess 562 is formed to receive and accommodate the projection 561.

The projection 561 is formed to project from a radial inside edge of the second axial end surface 519 in the same direction as the extending direction of the recess, i.e., in the one direction along the central axis. The projection 561 is formed to be inserted in a slightly movable manner in radial directions in the recess 562. The projection 561 and the recess 562 provide a male-female joint with play.

In the above mentioned embodiments, the collar 13 is disposed in the solenoid 6 to increase attracting force. Alternatively, the collar 13 may be removed. In this arrangement, only a portion 11 of the stator core works to supply axially extending components of magnetic flux through the front end of the plunger 9 to attract the plunger 9 toward the spool 2. A portion 12 of the stator core works to supply radially extending magnetic flux between through radial outside surface of the plunger 9.

An arrangement of the ports formed on the sleeve 1 is not limited to the preceding embodiments. For example, the advancing chamber and the retarding chamber may be replaced each other. In this case, the ports may be arranged in the following order from the distal end or the base end of the sleeve 1: the retarding drain port, the retarding output port, the oil supply port, the advancing output port, and the advancing drain port.

In the preceding embodiments, single OCV has the ports for both the advancing chamber and the retarding chamber. Alternatively, the variable valve timing system may have two OCV, one for controlling oil supply and oil discharge for the advancing chamber and the other one for controlling oil supply and oil discharge for the retarding chamber. In this case, OCV may have three ports which are arranged on the sleeve 1 from the distal end to the base end in the following order: a drain port, an output port, and an oil supply port. Alternatively, OCV may have three ports which are arranged on the sleeve 1 from the distal end to the base end in the following order: a drain port, an oil supply port, and an output port.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations are preferred, other combinations and configurations, including more, less or only a single element, are also within the spirit and scope of the present disclosure.

What is claimed is:

1. An electromagnetic valve comprising:
a spool valve having a sleeve formed in a cylindrical shape extending along a central axis from a base end to a distal end, and a spool supported within a spool bore formed in the sleeve in a reciprocally movable manner;
a shaft disposed axially next to the spool in contact with the base end of the spool in a manner that the shaft is capable of inclining relative to the spool; and
an electromagnetic actuator having a stator core formed in a cylindrical shape and fixed on the base end of the sleeve, a cup guide formed in a bottomed cylindrical shape and disposed radial inside of the stator core, a movable core supported in a guide bore formed within the cup guide in a reciprocally movable manner and connected to the spool via the shaft in an integrally movable manner, and a coil excited by current to magnetize the movable core and the stator core, wherein
the shaft has a first stepped portion formed in a shape to provide a male-female joint, the first stepped portion being formed on a first end portion, which comes in contact with the movable core,
the movable core has a second stepped portion formed in a shape to provide the male-female joint with the first stepped portion, the second stepped portion being formed on a second end portion, which comes in contact with the shaft,
the male-female joint is a loose joint which defines a small clearance between the first stepped portion and the second stepped portion,
the loose joint with the small clearance is configured to engage in a slanting manner, and
inclination of the shaft relative to the spool transmits axial movement of the movable core to the spool by the male-female joint.

2. The electromagnetic valve claimed in claim 1, wherein
one of the first stepped portion or the second stepped portion has a projection, and wherein
the other one of the first stepped portion or the second stepped portion has a recess, which provides a male-female joint with the projection.

3. The electromagnetic valve claimed in claim 2, wherein
the first stepped portion has a first axial end surface, which is formed in a ring shape, and a projection, which is projected from a radial inside of the first axial end surface in one direction along the central axis, and wherein
the second stepped portion has a second axial end surface, which is formed in a ring shape and comes in contact with the first axial end surface, and a recess, which extends from a radial inside of the second axial end surface in the same direction as the projecting direction of the projection and provides the male-female joint with the projection.

4. The electromagnetic valve claimed in claim 2, wherein
the first stepped portion has a first axial end surface, which is formed in a ring shape, and a recess, which extends from a radial inside of the first axial end surface in one direction along the central axis, and wherein
the second stepped portion has a second axial end surface, which is formed in a ring shape and comes in contact with the first axial end surface, and a projection, which is projected from a radial inside of the second axial end surface in the same direction as the extending direction of the recess and provides the male-female joint with the recess.

5. The electromagnetic valve claimed in claim 2, wherein
the projection and the recess provides two or more force transmitting points from the movable core to the shaft, when the projection and the recess are inclined with each other, the force transmitting points being located about the central axis of the spool.

6. The electromagnetic valve claimed in claim 5, wherein
the projection is formed to have a tapered profile defining gradually decreasing outer diameter from a base to a distal end of the projection.

7. The electromagnetic valve claimed in claim 2, wherein
the projection is formed to have a curved profile.

8. The electromagnetic valve claimed in claim 2, wherein
the small clearance is also between the projection and the recess.

9. The electromagnetic valve claimed in claim 1, wherein
the shaft is formed in a cup shape which opens on at least one end in an axial direction and defines a hollow portion therein.

10. The electromagnetic valve claimed in claim 9, wherein
the spool has a spool axial bore which penetrates the center of the spool along the central axis, and wherein
the hollow portion has an opening which communicates with the axial bore, and wherein
the opening is formed on a side where the shaft opens.

11. The electromagnetic valve claimed in claim 9, wherein
the movable core has a core axial bore which penetrates the center of the movable core along the central axis, and wherein the hollow portion has a communicating aperture which communicates with the core axial bore, and wherein the communicating aperture is formed on a side where the shaft has a bottom.

12. The electromagnetic valve claimed in claim 9, wherein the shaft has a cylindrical side wall extending along the central axis, the cylindrical side wall defining a communicating aperture which penetrates the cylindrical side wall in a radial direction and communicates a radial inside of the shaft and a radial outside of the shaft.

13. The electromagnetic valve claimed in claim 1, wherein the electromagnetic actuator has a magnetically opposing portion disposed to axially oppose the movable core to attract the movable core toward the spool valve.

* * * * *